UNITED STATES PATENT OFFICE 2,654,784

METHOD FOR THE MANUFACTURE OF PHOSPHORIC ACID ANHYDRIDES

Henry Tolkmith, Midland, Mich., assignor to The Dow Chemical Company, Midland, Mich., a corporation of Delaware No Drawing. Application August 17, 1951, Serial No. 242,410

6 Claims. (Cl. 260—545)

The present invention is concerned with a novel method for the manufacture of phosphoric acid anhydrides of the formula

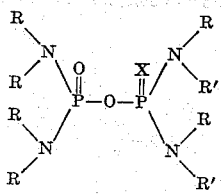

In this and succeeding formulae each R represents a lower alkyl radical, R' represents a lower alkyl radical or hydrogen and X represents a chalcogen, i. e. oxygen or sulfur. The expression "lower alkyl" as herein employed refers to methyl, ethyl, propyl and butyl.

The new process comprises reacting a tetraalkyldiamidophosphoryl phosphoric dichloride of the formula

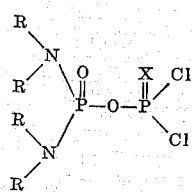

with at least one and no more than two amines of the formula

successively to displace the chlorines in the tetraalkyldiamidophosphoryl phosphoric dichloride with amido groups. The reaction is carried out in an inert nonpolar organic solvent such as diethyl ether, xylene, toluene or benzene, and in a sufficient excess of the amine reactant to act as acceptor for by-product hydrogen chloride.

Where it is desired to introduce two identical amido groups into the molecule, 1 molecular proportion of the tetraalkyldiamidophosphoryl phosphoric dichloride is reacted with at least 2 molecular proportions of the amine in a sufficient excess of the amine to act as hydrogen chloride acceptor. A preferred operation comprises the reaction of 2 moles of the amine with each mole of the tetraalkyldiamidophosphoryl phosphoric dichloride. In carrying out the reaction, either reactant may be dispersed in the inert nonpolar organic solvent and added to the other with stirring and under suitable conditions of temperature in the reaction vessel. Alternatively, either reactant may be added to the other which is dispersed in the nonpolar solvent.

Where it is desired that the substituting amido groups differ, 1 molecular proportion of the tetraalkyldiamidophosphoryl phosphoric dichloride is successively reacted with one molecular proportion of each amine in a sufficient excess of each amine reactant to act as hydrogen chloride acceptor. In practice, the tetraalkyldiamidophosphoryl phosphoric dichloride is usually dispersed in an inert nonpolar organic solvent and the amines successively added portionwise to the solvent mixture with stirring. Alternatively, the amines may be separately dispersed in the solvent and the two solvent mixtures successively added portionwise to the tetraalkyldiamidophosphoryl phosphoric dichloride under suitable conditions of temperature in the reaction vessel.

The reaction of the present invention proceeds smoothly at the temperature range of from —5° to 85° C. Since the employed amines are frequently gases or low boiling liquids, operation at the lower temperatures may sometimes be advantageously employed to avoid the loss of amine. The reaction is somewhat exothermic and the temperature may be controlled by regulating the rate of contacting the reactants and by the addition and subtraction of heat if required.

The rate at which the reaction takes place has been found to vary directly with the temperature employed. In practice, the reaction is generally carried out over a period of from 1 to 6 hours or longer, the longer periods of reaction being employed at the lower temperatures.

The contacting of the reactants, as previously described, may be carried out under any practical operating pressure. Since the employed amine reactants are frequently gases or low boiling liquids, operation under somewhat increased pressure is sometimes preferred in order to avoid the loss of amine.

Following the reaction, the reaction mixture may be filtered and the filtrate distilled under reduced pressure to separate low boiling constituents and to obtain as a residue the desired phosphoric acid anhydride product. Since these products have a tendency to decompose at temperatures in excess of about 180° C., distillation temperatures in excess of 180° C. for any appreciable period of time should be avoided.

The products as obtained in the practice of the present method may be employed in parasiticidal compositions without purification or separation. If desired, however, they may be separated from the reaction product by molecular distillation.

Example 1

Tetramethyldiamidophosphoric N,N-dimethyl-N'-methyl-diamidophosphoric anhydride

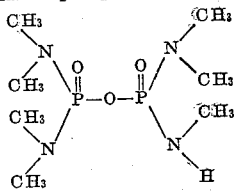

11.3 grams (0.252 mole) of gaseous dimethylamine was added slowly at room temperature with stirring to 34 grams (0.126 mole) of tetramethyldiamidophosphoryl phosphoric dichloride (having a refractive index $n/D$ of 1.4669 at 20° C.) dispersed in 250 milliliters of benzene. Following the addition, stirring was continued for about 3 hours. 7.8 grams (0.252 mole) of gaseous methylamine was then added slowly at room temperature with stirring to the above intermediate reaction product. Following the latter addition, the reaction mixture was stirred for about 3 hours and thereafter filtered to separate amine hydrochloride. The filtrate was then distilled under reduced pressure at temperatures gradually increasing up to a temperature of 85° C. to separate low boiling constituents and to obtain as a residue a tetramethyldiamidophosphoric N,N - dimethyl - N' - methyldiamidophosphoric anhydride product. The latter is a viscous oil having a refractive index $n/D$ of 1.4711 at 20° C.

Example 2

Bis(tetramethyldiamidophosphoric) anhydride

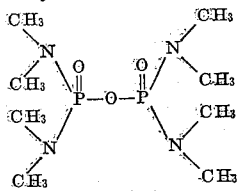

27 grams (0.6 mole) of gaseous dimethylamine was added slowly to 44 grams (0.164 mole) of tetramethyldiamidophosphoryl phosphoric dichloride dispersed in 600 milliliters of diethyl ether. The addition was carried out with stirring and at a temperature of from —5° to 25° C. Upon completion of the reaction, the mixture was filtered and the filtrate distilled under reduced pressure at temperatures gradually increasing up to a temperature of 40° C. to separate low boiling constituents and to obtain as a residue a bis(tetramethyldiamidophosphoric) anhydride product. Bis(tetramethyldiamidophosphoric) anhydride is an oily liquid having a boiling point of 139° to 140° C. at 1.5 millimeters pressure and a refractive index $n/D$ of 1.4620 at 25° C.

Example 3

N,N-dimethyl-N',N'-dibutyldiamidophosphoric N'',N''-dimethyl-N'''-methyldiamidophosphoric anhydride

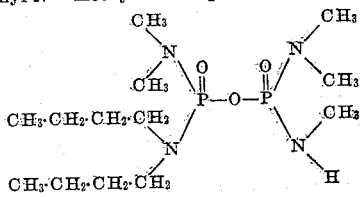

2.88 grams (0.0643 mole) of gaseous dimethylamine was added at room temperature with stirring to 11.5 grams (0.032 mole) of N,N-dimethyl-N',N'-dibutyldiamidophosphoryl phosphoric dichloride (having a refractive index $n/D$ of 1.4728 at 20° C.) dispersed in about 250 milliliters of benzene. Stirring was then continued for about 1 hour and 2 grams (0.0643 mole) of gaseous methylamine added slowly at room temperature with stirring to the above intermediate reaction product. Following the latter addition, the reaction mixture was stirred for about 1 hour and thereafter filtered to separate amine hydrochloride. The filtrate was then distilled under reduced pressure at temperatures gradually increasing up to a temperature of 60° C. to separate low boiling constituents and to obtain as a residue an N,N - dimethyl - N',N' - dibutyldiamidophosphoric N'',N'' - dimethyl - N''' - methyldiamidophosphoric anhydride product. The latter is a viscous oil having a refractive index $n/D$ of 1.4750 at 20° C.

Example 4

Tetramethyldiamidophosphoric N-isopropyl-N'-methyl-diamidothiophosphoric anhydride

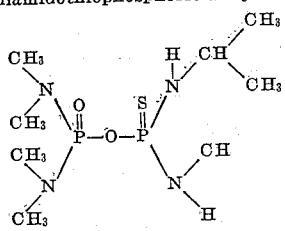

10 grams (0.17 mole) of isopropylamine was dissolved in 50 milliliters of benzene and the resulting solution added portionwise at room temperature with stirring to 22.8 grams (0.08 mole) of tetramethyldiamidophosphoryl thiophosphoric dichloride (having a refractive index $n/D$ of 1.5132 at 20° C.) dispersed in 50 milliliters of benzene. Stirring was thereafter continued for about 3 hours. 5.6 grams (0.18 mole) of gaseous methylamine was then added slowly at room temperature with stirring to the above intermediate reaction product. Following the latter addition, the mixture was stirred for about 3 hours and thereafter filtered. The filtrate was then distilled under reduced pressure at gradually increasing temperatures up to a temperature of 80° C. to separate low boiling constituents and to obtain as a residue a tetramethyldiamidophosphoric N - isopropyl - N' - methylthiophosphoric anhydride product. The latter is a viscous oil having a refractive index $n/D$ of 1.5139 at 20° C.

In a similar manner other phosphoric acid anhydrides may be prepared as follows:

Tetramethyldiamidophosphoric N,N' - diisopropyldiamidophosphoric anhydride by reacting together tetramethyldiamidophosphoryl phosphoric dichloride and isopropylamine.

Tetrabutyldiamidophosphoric N,N' - dimethyldiamidophosphoric anhydride by reacting together tetrabutyldiamidophosphoryl phosphoric dichloride and methylamine.

Tetramethyldiamidophosphoric tetramethyldiamidothiophosphoric anhydride by reacting together tetramethyldiamidophosphoryl thiophosphoric dichloride and dimethylamine.

Tetramethyldiamidophosphoric N,N' - diisopropyldiamidothiophosphoric anhydride by reacting together tetramethyldiamidophosphoryl thiophosphoric dichloride and isopropylamine.

The phosphoric acid anhydrides as prepared in accordance with the present invention are oily liquids somewhat soluble in many organic solvents and water. They are of value as intermediates for the preparation of other phosphorus derivatives and as toxic constituents of parasiticide compositions. The use of a number of the products for combating insect pests is disclosed in U. S. Patent No. 2,502,966.

The tetraalkyldiamidophosphoryl phosphoric dichlorides, employed as starting materials in the process of the present invention, may be produced by the methods disclosed in my copending application Serial No. 242,405. This process comprises reacting together at a temperature of from 40° to 110° C. at least one molecular proportion of a phosphorus chalcogen chloride with one molecular proportion of an O-alkyl tetraalkyldiamidophosphate of the formula

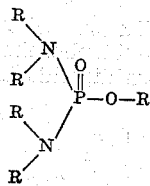

The reaction involves a condensation resulting in the formation of an alkyl chloride (RCl). In practice, substantially 0.33 of the chlorine in the phosphorus chalcogen chloride may be recovered as alkyl chloride.

In carrying out the reaction, the phosphorus chalcogen chloride and O-alkyl tetraalkyldiamidophosphate are mixed together and the resulting dispersion heated at a temperature of from 40° to 110° C. until no further substantial amounts of alkyl chloride of reaction are liberated. Upon completion of the reaction, the mixture may be distilled under reduced pressure and under 110° C. to separate low boiling constituents and to obtain as a residue the desired tetraalkyldiamidophosphoryl phosphoric dichloride product.

I claim:
1. A process for the manufacture of pyrophosphoramides of the formula

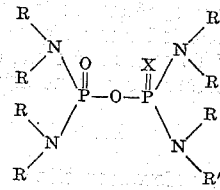

which comprises reacting in an inert nonpolar organic solvent a diamidophosphoryl phosphoric dichloride of the formula

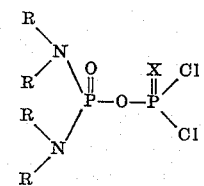

with at least one amine of the formula

the reaction being carried out in a sufficient excess of the amine reactant to act as hydrogen chloride acceptor, each symbol R in the above formulae representing a lower alkyl radical, each symbol R' representing a member of the group consisting of the lower alkyl radicals and hydrogen, and the symbol X representing a chalcogen.

2. A process for the manufacture of a pyrophosphoramide of the formula

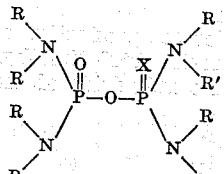

which comprises reacting in an inert nonpolar organic solvent a diamidophosphoryl phosphoric dichloride of the formula

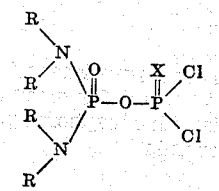

with at least one and not more than two amines of the formula

the reaction being carried out at a temperature of from −5° to 85° C. successively to displace the chlorines in the diamidophosphoryl phosphoric dichloride with amido groups, and when the chlorines are to be replaced with the same amido group, 1 molecular proportion of the diamidophosphoryl phosphoric dichloride being reacted with at least 2 molecular proportions of the amine in the presence of a sufficient excess of the amine reactant to act as hydrogen chloride acceptor and when the chlorines are to be replaced with different amido groups, 1 molecular proportion of the diamidophosphoryl phosphoric dichloride being successively reacted with 1 molecular proportion of each amine in the presence of a sufficient excess of each amine reactant to act as hydrogen chloride acceptor, each symbol R in the above formulae representing a lower alkyl radical and each symbol R' representing a member of the group consisting of the lower alkyl radicals and hydrogen, and the symbol X representing a chalcogen.

3. A method for the production of bis(tetramethyldiamidophosphoric) anhydride of the formula

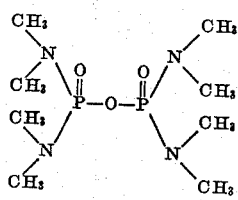

which comprises reacting in an inert nonpolar organic solvent 1 molecular proportion of tetramethyldiamidophosphoryl phosphoric dichloride of the formula

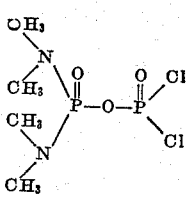

with at least 2 molecular proportions of dimethylamine, the reaction being carried out at a temperature of from −5° to 85° C. and in a sufficient excess of the amine reactant to act as hydrogen chloride acceptor.

4. A method for the production of tetramethyldiamidophosphoric N,N-dimethyl-N′-methyldiamidophosphoric anhydride of the formula

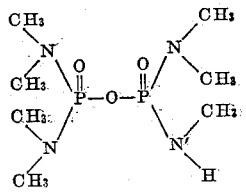

which comprises successively reacting in an inert nonpolar organic solvent 1 molecular proportion of tetramethyldiamidophosphoryl phosphoric dichloride of the formula

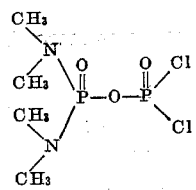

with 1 molecular proportion of dimethylamine and 1 molecular proportion of methylamine, the reaction being carried out at a temperature of from −5° to 85° C. and in a sufficient excess of each amine reactant to act as hydrogen chloride acceptor.

5. A method for the production of tetramethyldiamidophosphoric N-isopropyl N′-methyldiamidothiophosphoric anhydride of the formula

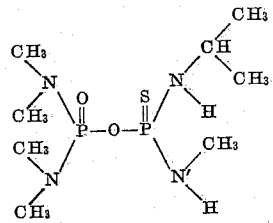

which comprises successively reacting in an inert nonpolar organic solvent 1 molecular proportion of tetramethyldiamidophosphoryl thiophosphoric dichloride of the formula

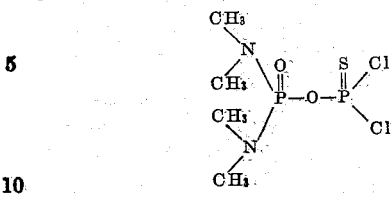

with 1 molecular proportion of isopropylamine and 1 molecular proportion of methylamine, the reaction being carried out at a temperature of from −5° to 85° C. and in a sufficient excess of each amine reactant to act as hydrogen chloride acceptor.

6. A method for the production of N,N-dimethyl-N′,N′-dibutyldiamidophosphoric N″,N″-dimethyl - N‴ - methyldiamidophosphoric anhydride of the formula

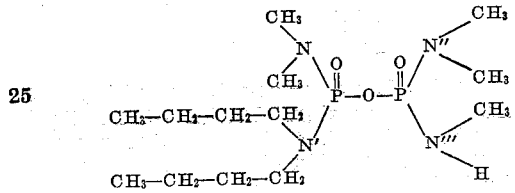

which comprises successively reacting in an inert nonpolar organic solvent 1 molecular proportion of N,N-dimethyl-N′,N′-dibutyldiamidophosphoryl phosphoric dichloride of the formula

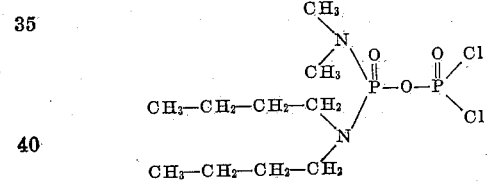

with 1 molecular proportion of dimethylamine and 1 molecular proportion of methylamine, the reaction being carried out at a temperature of from −5° to 85° C. and in a sufficient excess of each amine reactant to act as hydrogen chloride acceptor.

HENRY TOLKMITH.

No references cited.